United States Patent
Bishop

(10) Patent No.: US 8,793,802 B2
(45) Date of Patent: Jul. 29, 2014

(54) SYSTEM, METHOD, AND COMPUTER PROGRAM PRODUCT FOR PREVENTING DATA LEAKAGE UTILIZING A MAP OF DATA

(75) Inventor: Michael G. Bishop, Thame (GB)

(73) Assignee: McAfee, Inc., Santa Clara, CA (US)

( * ) Notice: Subject to any disclaimer, the term of this patent is extended or adjusted under 35 U.S.C. 154(b) by 1360 days.

(21) Appl. No.: 11/752,208

(22) Filed: May 22, 2007

(65) Prior Publication Data

US 2013/0247208 A1    Sep. 19, 2013

(51) Int. Cl.
*H04L 29/06* (2006.01)

(52) U.S. Cl.
USPC ............................ 726/26; 726/4; 726/22

(58) Field of Classification Search
USPC ..................... 726/22, 23, 26, 27, 35
See application file for complete search history.

(56) References Cited

U.S. PATENT DOCUMENTS

| | | | |
|---|---|---|---|
| 4,414,628 A | 11/1983 | Ahuja et al. | |
| 5,983,267 A | 11/1999 | Shklar et al. | |
| 5,987,610 A | 11/1999 | Franczek et al. | |
| 6,073,142 A | 6/2000 | Geiger et al. | |
| 6,128,713 A | 10/2000 | Eisler et al. | |
| 6,314,563 B1 | 11/2001 | Agesen et al. | |
| 6,389,510 B1 | 5/2002 | Chen et al. | |
| 6,460,050 B1 | 10/2002 | Pace et al. | |
| 7,000,247 B2 | 2/2006 | Banzhof | |
| 7,155,414 B2 | 12/2006 | Barritz et al. | |
| 7,178,166 B1 | 2/2007 | Taylor et al. | |
| 7,185,238 B2 | 2/2007 | Wedel et al. | .......... 714/100 |
| 7,472,163 B1 | 12/2008 | Ben-Yoseph et al. | |
| 7,506,155 B1 | 3/2009 | Stewart et al. | |
| 7,592,906 B1 | 9/2009 | Hanna et al. | |
| 7,735,116 B1 | 6/2010 | Gauvin | |
| 7,774,611 B2 | 8/2010 | Muntz et al. | |
| 8,141,127 B1 * | 3/2012 | Mustafa | ................ 726/1 |
| 2003/0018878 A1 | 1/2003 | Dorward et al. | |
| 2003/0046311 A1 * | 3/2003 | Baidya et al. | ............ 707/200 |
| 2003/0125997 A1 | 7/2003 | Stoltz | |
| 2004/0083224 A1 | 4/2004 | Yoshida | |
| 2004/0083286 A1 | 4/2004 | Holden et al. | |
| 2004/0103310 A1 | 5/2004 | Sobel et al. | |
| 2004/0123127 A1 | 6/2004 | Teicher et al. | |
| 2004/0143746 A1 | 7/2004 | Ligeti et al. | |
| 2004/0250113 A1 | 12/2004 | Beck | |
| 2004/0260818 A1 | 12/2004 | Valois et al. | |
| 2005/0027980 A1 | 2/2005 | Peled et al. | |
| 2005/0132225 A1 | 6/2005 | Gearhart | |
| 2005/0257267 A1 | 11/2005 | Williams et al. | |
| 2005/0273600 A1 | 12/2005 | Seeman | |
| 2006/0005254 A1 | 1/2006 | Ross | |
| 2006/0072451 A1 | 4/2006 | Ross | |
| 2006/0075494 A1 * | 4/2006 | Bertman et al. | ............ 726/22 |

(Continued)

OTHER PUBLICATIONS

U.S. Appl. No. 11/734,062, filed Apr. 11, 2007.

(Continued)

*Primary Examiner* — Jeffrey Pwu
*Assistant Examiner* — Thong Truong
(74) *Attorney, Agent, or Firm* — Patent Capital Group

(57) ABSTRACT

A system, method, and computer program product are provided for preventing data leakage utilizing a map of data. In use, information describing data stored on at least one system is received. To this end, a map of the data is generated, utilizing the information. Further, data leakage is prevented, utilizing the map.

37 Claims, 6 Drawing Sheets

(56) References Cited

U.S. PATENT DOCUMENTS

| | | |
|---|---|---|
| 2006/0130139 A1 | 6/2006 | Sobel et al. |
| 2006/0156408 A1 | 7/2006 | Himberger et al. |
| 2006/0179476 A1 | 8/2006 | Challener et al. |
| 2007/0055752 A1 | 3/2007 | Wiegand et al. |
| 2007/0101432 A1 | 5/2007 | Carpenter |
| 2007/0107043 A1 | 5/2007 | Newstadt et al. |
| 2007/0124803 A1 | 5/2007 | Taraz |
| 2007/0130127 A1 | 6/2007 | Passamore et al. |
| 2007/0136814 A1 | 6/2007 | Lee et al. |
| 2007/0143827 A1 | 6/2007 | Nicodemus et al. |
| 2007/0143851 A1 | 6/2007 | Nicodemus et al. |
| 2007/0156659 A1 | 7/2007 | Lim |
| 2007/0220593 A1 | 9/2007 | Burakoff et al. |
| 2007/0250932 A1 | 10/2007 | Kothari |
| 2007/0261121 A1 | 11/2007 | Jacobson |
| 2008/0022382 A1 | 1/2008 | Bradbury |
| 2008/0064503 A1 | 3/2008 | Oberberger |
| 2008/0098230 A1 | 4/2008 | Kalibjian |
| 2008/0148346 A1 | 6/2008 | Gill et al. |
| 2008/0244690 A1 | 10/2008 | Kulkarni et al. |
| 2008/0262863 A1 | 10/2008 | Stickley et al. |

OTHER PUBLICATIONS

Non-Final Office Action from U.S. Appl. No. 11/734,062, dated Jul. 13, 2009.
Final Office Action from U.S. Appl. No. 11/734,062, dated Feb. 23, 2010.
USPTO Jul. 13, 2009 Non-Final Rejection and Nov. 13, 2009 Response to Jul. 13, 2009 Nonfinal Rejection from U.S. Appl. No. 11/734,062, filed Apr. 11, 2007.
USPTO Jun. 23, 20103 Final Rejection and Jun. 23, 2010 RCE Response to Jun. 23, 2010 Final Rejection from U.S. Appl. No. 11/734,062, filed Apr. 11, 2007.
USPTO Apr. 7, 2011 Nonfinal Office Action from U.S. Appl. No. 11/734,062.
USPTO Jul. 7, 2011 Response to Apr. 7, 2011 Nonfinal Office Action from U.S. Appl. No. 11/734,062.
USPTO Aug. 17, 2011 Final Office Action from U.S. Appl. No. 11/734,062.
USPTO Oct. 10, 2011 RCE Response to Aug. 17, 2011 Final Office Action from U.S. Appl. No. 11/734,062.
U.S. Appl. No. 11/864,175, filed Sep. 28, 2007.
USPTO Jun. 26, 2013 Nonfinal Office Action from U.S. Appl. No. 11/734,062.
Office Action Received for the U.S. Appl. No. 11/864,175, Mailed on Aug. 6, 2010, 11 pages.
Pre-Appeal Brief for the U.S. Appl. No. 11/864,175, filed Apr. 26, 2011, 7 pages.
Final Office Action Received for the U.S. Appl. No. 11/864,175, mailed on Nov. 2, 2012, 10 pages.
Non-Final Office Action Received for the U.S. Appl. No. 11/864,175, mailed on Mar. 29, 2012, 9 pages.
Final Office Action Received for the U.S. Appl. No. 11/864,175, mailed on Dec. 5, 2011, 9 pages.
Non-Final Office Action Received for the U.S. Appl. No. 11/864,175, mailed on Jun. 21, 2011, 10 pages.
Final Office Action Received for the U.S. Appl. No. 11/864,175, mailed on Feb. 4, 2011, 10 pages.
Response to Non-Final Office Action received for U.S. Appl. No. 11/864,175, filed Jan. 6, 2011, 8 pages.
Response to Non-Final Office Action received for U.S. Appl. No. 11/864,175, filed Sep. 20, 2011, 9 pages.
RCE and Response to Final Office Action received for U.S. Appl. No. 11/864,175, filed Mar. 5, 2012, 9 pages.
Response to Non-Final Office Action received for U.S. Appl. No. 11/864,175, filed Jul. 26, 2012, 10 pages.
Office Action received for U.S Appl. No. 11/734,062, mailed on Nov. 14, 2013, 10 pages.
Notice of Allowance received for U.S. Appl. No. 11/734,062, mailed on Jan. 29, 2014, 14 pages.

* cited by examiner

SYSTEM, METHOD, AND COMPUTER PROGRAM PRODUCT FOR PREVENTING DATA LEAKAGE UTILIZING A MAP OF DATA

FIELD OF THE INVENTION

The present invention relates to securing data, and more particularly to preventing data leakage.

BACKGROUND

Traditionally, the transfer of data has been controlled in order to prevent data leakage. Such data leakage typically includes theft of data, disclosure of confidential data, non-malicious loss of data, etc. The transfer of data has typically been controlled utilizing transfer control mechanisms. However, such transfer control mechanisms have been limited to preventing data leakage, in response to a request to transmit data, and sometimes even during the transmission of data. There is thus a need for addressing these and/or other limitations associated with the prior art.

SUMMARY

A system, method, and computer program product are provided for preventing data leakage utilizing a map of data. In use, information describing data stored on at least one system is received. In addition, a map of the data is generated, utilizing the information. To this end, data leakage is prevented, utilizing the map.

DETAILED DESCRIPTION

Figure 1:
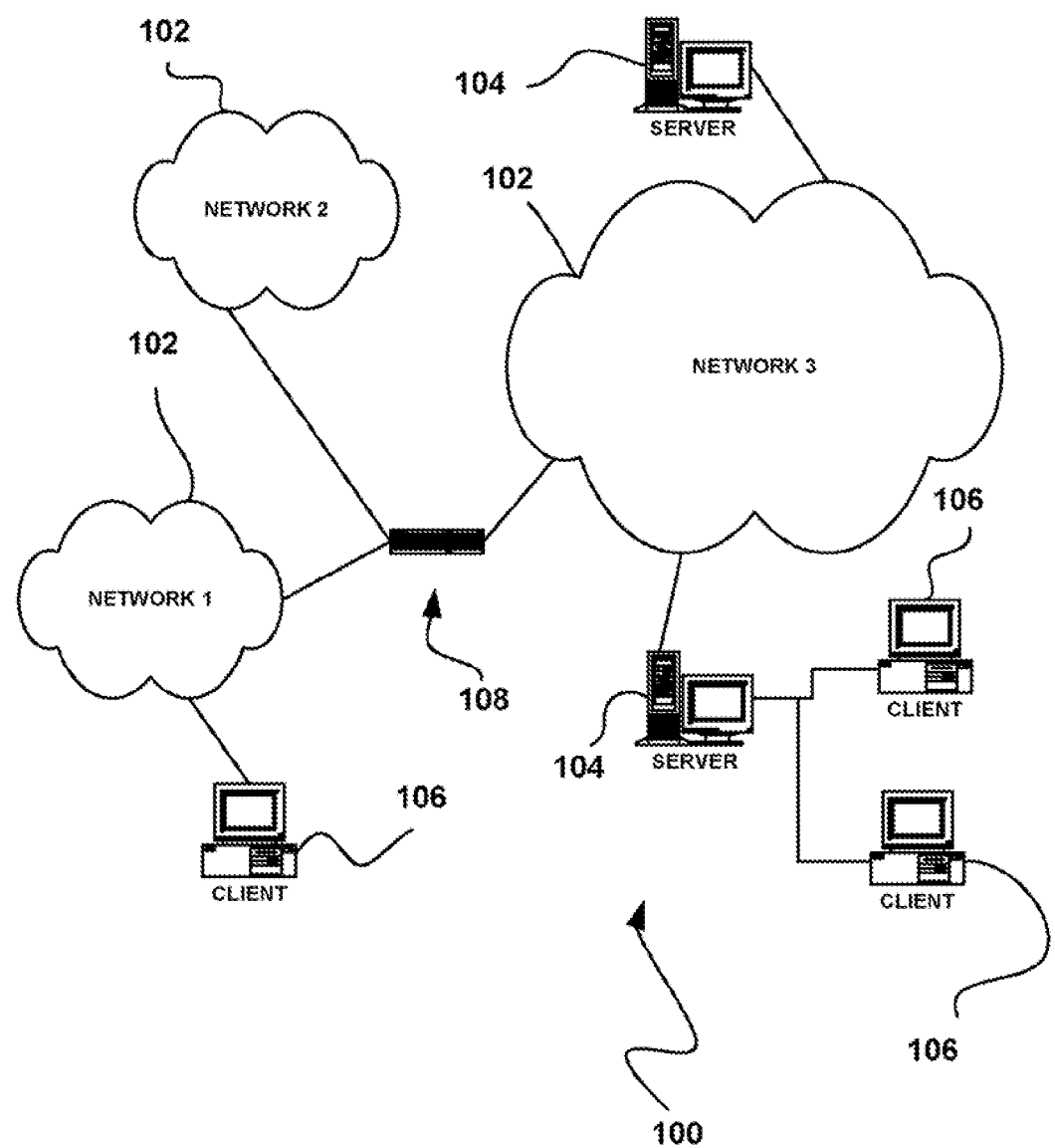
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
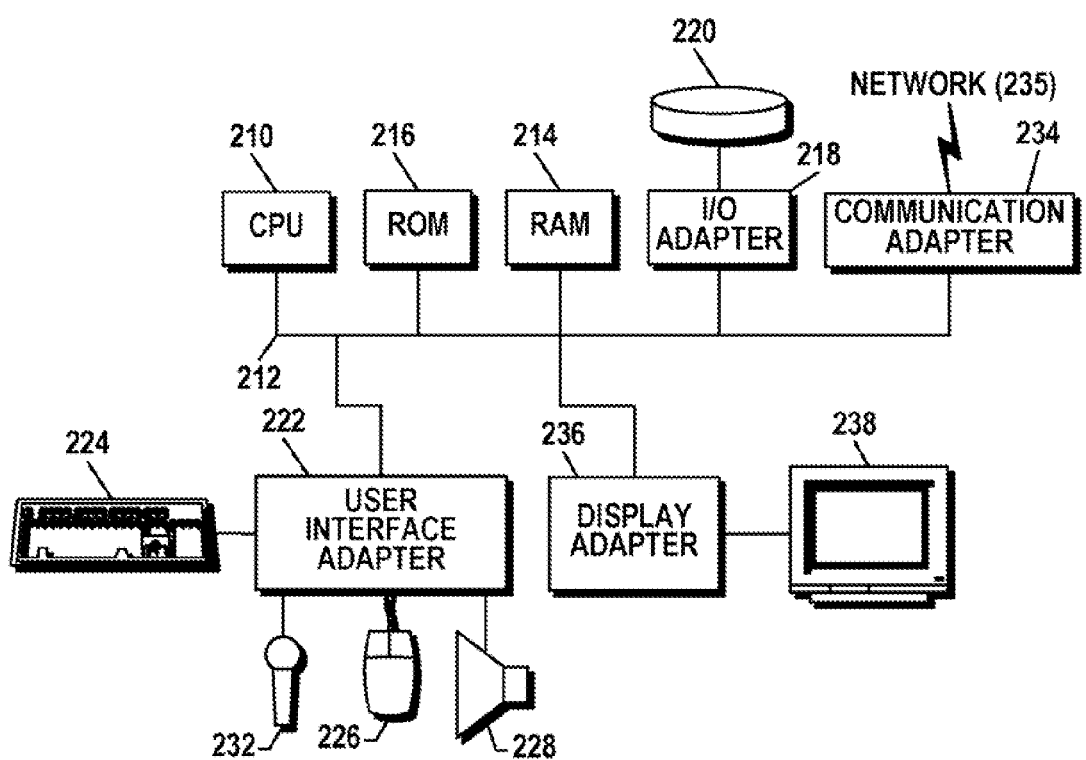
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
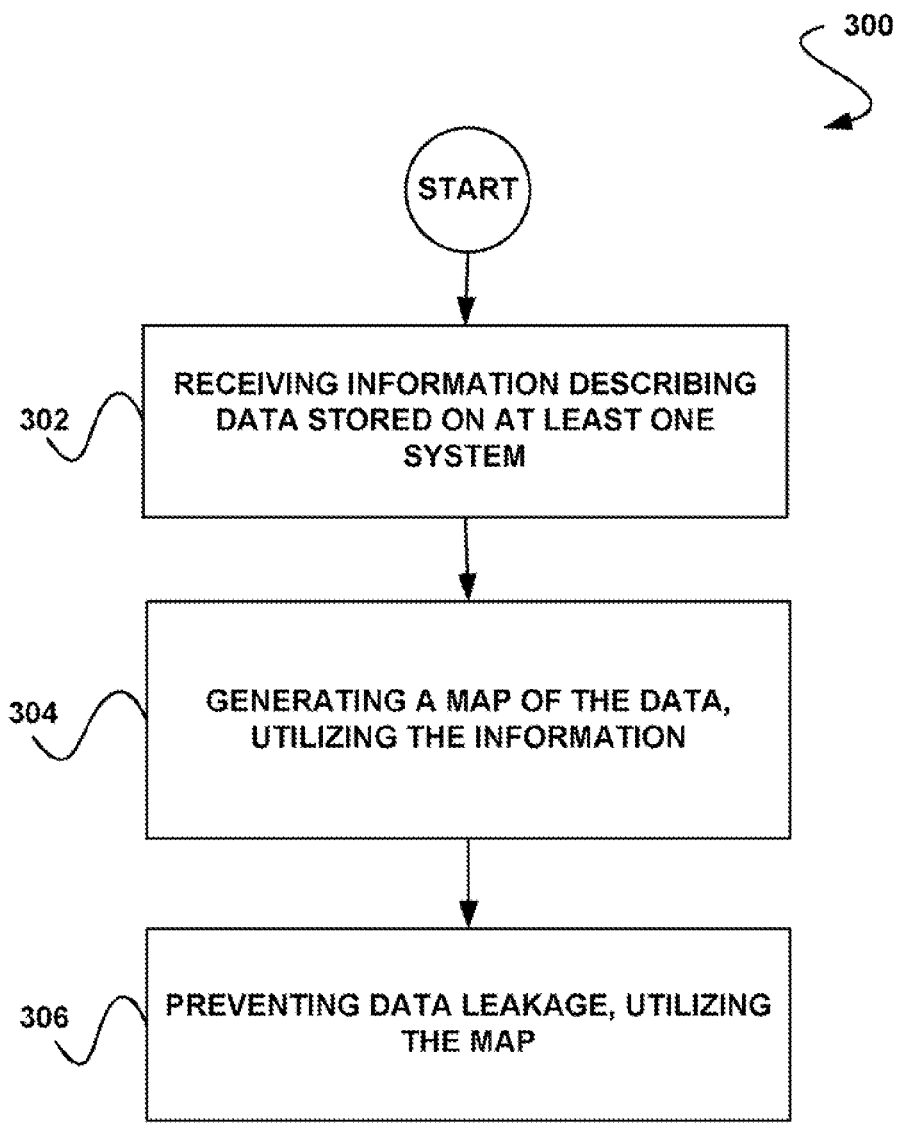
FIG. 3 shows a method for preventing data leakage utilizing a map of data, in accordance with another embodiment.

FIG. 3 shows a method 300 for method for preventing data leakage utilizing a map of data, in accordance with another embodiment. As an option, the method 300 may be carried out in the context of the architecture and environment of FIGS. 1 and/or 2. Of course, however, the method 300 may be carried out in any desired environment.

As shown in operation 302, information describing data stored on at least one system is received. In the context of the present embodiment, the system may include any system capable of storing the data. For example, the system may include any of the clients and/or servers described above with respect to FIGS. 1 and/or 2. In addition, the system may optionally be located on a network (e.g. any of the networks described above with respect to FIG. 1).

Further, in one embodiment, the data may be stored on a single system. In another embodiment, the data may be stored on a group of systems. Still yet, in various embodiments, the data may include any file, document, electronic mail (e-mail) message, program, code, etc. capable of being stored on the system.

Moreover, the information describing the data may include any information capable of describing at least one aspect of the data. In one embodiment, the information may include a categorization of the data. Such categorization may indicate at least one category, type, etc. associated with the data. Just by way of example, the categorization may indicate whether the data includes financial data, product data, personnel data, personal data, engineering data, etc. As an option, the categorizations may be associated with various groups within an organization (e.g. engineering group, human resources group, marketing group, finance group, etc.).

In another embodiment, the information may include a statistical analysis of the data. For example, the statistical analysis may indicate a number of occurrences of at least one predetermined keyword within the data. Just by way of example, a list of predetermined keywords may be defined (e.g. automatically, manually, etc.), such that contents of the data (e.g. text, etc.) may be analyzed against the predetermined keywords. Of course, however, the statistical analysis may include any statistical analysis involving the data.

In yet another embodiment, the information may include a location of the data. For example, the location may include a pathname associated with the data. In various other examples, the location may include an internet protocol (IP) address, a machine name, a user name and/or any other unique identifier associated with the system (or portion thereof) on which the data is stored.

Additionally, the information describing the data may be received in any desired manner. In one embodiment, the information may be received at a server. In another embodiment, the information may be received from an application (e.g. a crawler, etc.). Such application may optionally be located on the system on which the data is stored. Further, the information may be received over a network.

As shown in operation 304, a map of the data is generated, utilizing the information describing the data. In one embodiment, the map of the data may include a logical link associated with the information describing the data. For example, the map may associate different aspects of the information in a data structure (e.g. database, etc.).

To this end, generating the map of the data may include mapping a location of the data to a categorization of the data, in one embodiment. Just by way of example, a categorization of the data may be mapped to an IP address of the system on which the data is stored. Furthermore, information describing different data may be mapped to a single location of such data. Thus, each location may optionally be mapped to a plurality of categorizations, for example. In another embodiment, a group identifier that correlates with a plurality of systems may optionally be mapped to various categories of data stored on such systems.

Still yet, as shown in operation 306, data leakage is prevented, utilizing the map. In the context of the present description, the data leakage may include any at least potentially unwanted transfer of the data. For example, the data leakage may include data theft, disclosure of confidential data, etc.

In one embodiment, the data leakage may be prevented based on a comparison of a current map to a previously generated map. Such previously generated map may include any map generated prior to the map of the data generated in operation 304. Thus, any differences between the current map and the previously generated map may be identified based on the comparison.

To this end, the data leakage may be prevented based on the identified differences. For example, it may be determined whether the identified differences violate any predetermined policies. Optionally, such policies may be predetermined by an administrator, etc. In addition, the predetermined policies may indicate an allowable threshold number of differences, allowable categories that may be associated with particular locations, and/or groups with respect to the map, etc.

Accordingly, if it is determined that the identified differences violate any predetermined policy, an action may be taken to prevent data leakage. Such action may include securing the data. For example, the data may be secured by preventing transfer of the data, removal of the data, and/or any other action capable of at least potentially preventing the data leakage. Of course, it should be noted that the data leakage may be prevented in any desired manner that utilizes the map.

To this end, potential leakage of the data may optionally be identified prior to a request for transmission thereof.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
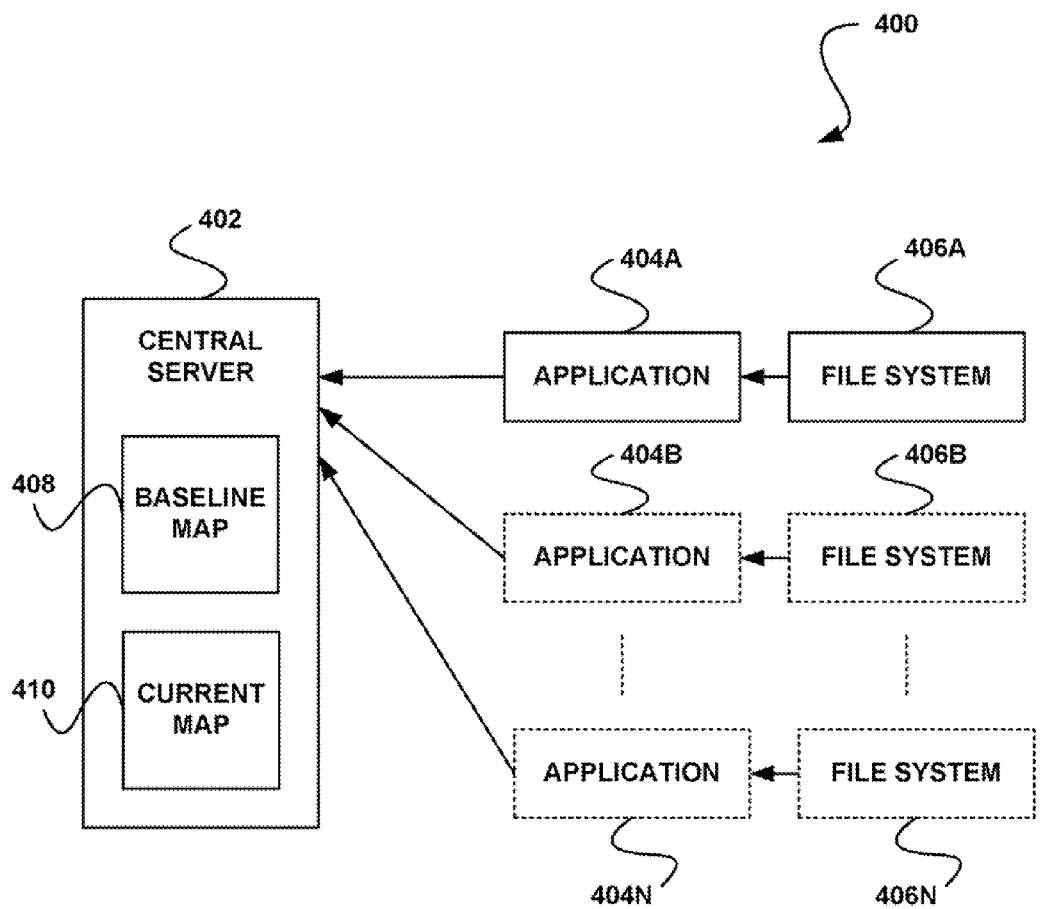
FIG. 4 shows a system for preventing data leakage utilizing a map of data, in accordance with yet another embodiment.

FIG. 4 shows a system 400 for preventing data leakage utilizing a map of data, in accordance with yet another embodiment. As an option, the system 400 may be implemented in the contest of the architecture and functionality of FIGS. 1-3. Of course, however, the system 400 may be implemented in any desired environment. It should also be noted that the aforementioned definitions may apply during the present description.

As shown, applications 404A-N is in communication with file systems 406A-N. In the context of the present embodiment, the file system 406A-N may include any system capable of storing data (e.g. files, e-mail messages, documents, etc.). Just by way of example, the file systems 406A-N may each include any one or more of the clients and/or servers described above with respect to FIGS. 1 and/or 2.

Optionally, the applications 404A-N may be in communication with the file systems 406A-N, as also shown. For example, each of the applications 404A-N may be in communication with a particular one of the file systems 406A-N. In one embodiment, the file systems 406A-N may include file systems located on a network, for example.

As an additional option, the applications 404A-N may be included within the corresponding file systems 406A-N. In another embodiment, the applications 404A-N may be located on another system remote to the corresponding file systems 404A-N, for remote monitoring. For example, such remotely located applications 404A-N may be in communication with the corresponding file systems 406A-N via a network.

Additionally, the applications 404A-N may each include any computer code, program, etc. capable of identifying data stored on the associated file systems 406A-N. In one embodiment, the applications 404A-N may each include a crawler application capable of identifying the data. The applications 404A-N may each also identify information describing the data stored on the associated file systems 406A-N. As further show, the applications 404A-N remain in communication with a central server 402.

The central server 402 may include any server capable of storing a baseline map 408 and a current map 410, as described below. For example, the central server 402 may include any of the servers described above with respect to FIGS. 1 and/or 2. Thus, the applications 404A-N may communicate the information describing the data to the central server 402.

While, in the context of the present description, the applications 404A-N are described as identifying the information describing the data, it should be noted that in another embodiment, the applications 404A-N may communicate the data (or a copy thereof) to the central server 402 such that the central server 402 may identify such information. Thus, logic for identifying the information describing the data may be located on the applications 404A-N and/or on the central server 402, in various embodiments.

Furthermore, in response to receipt of the information describing the data, the central server 402 may generate a map of the data, utilizing the information describing the data. In one embodiment, the map of the data may include a mapping of various aspects included in the information describing the data. Just by way of example, the map may include a mapping of a location of the data and at least one categorization of the data.

In one embodiment, the central server 402 may store the map as the baseline map 408 if it is determined that a map of the data has not previously been stored. Thus, the baseline map 408 may include an original, first, etc. map of the data. In another embodiment, the central server 402 may store the map as the baseline map 408 in response to a user request, user authorization, etc. Of course, the baseline map 408 may also be manually created by the user, for example, by mapping one or more locations to selected categorizations of data.

In still yet another embodiment, the central server 402 may store the map as the current map 410 if it is determined that a baseline map 408 of the data has previously been stored. As an option, the baseline map 408 and the current map 410 may be stored in a data structure of the central server 402, which may be capable of storing mappings of data. In this way, maps of the data generated at different times may be stored on the central server 402.

In one embodiment, the central server 402 may perform an action capable of preventing data leakage, utilizing the baseline map 408 and the current map 410. For example, the central server 402 may compare the current map 410 with the baseline map 408 for identifying differences associated therewith. If any of such differences violate predetermined policies, the action may be performed by the central server 402 for preventing leakage of the data. Just by way of example, the central server 402 may prevent a transmission of the data from the file servers 406A-N.

Strictly as an option, users of the system 400 may be allowed to organize the map into groups or user-defined supersets, to simplify the viewing of the data and/or relevant violations. For example, while a lowest level of the map may reflect an individual machine level, a higher level user view may reflect a "New York Office," for example, which contains a group called "Engineering" which, in turn, then contains all of the individual machines, etc.

Figure 5:
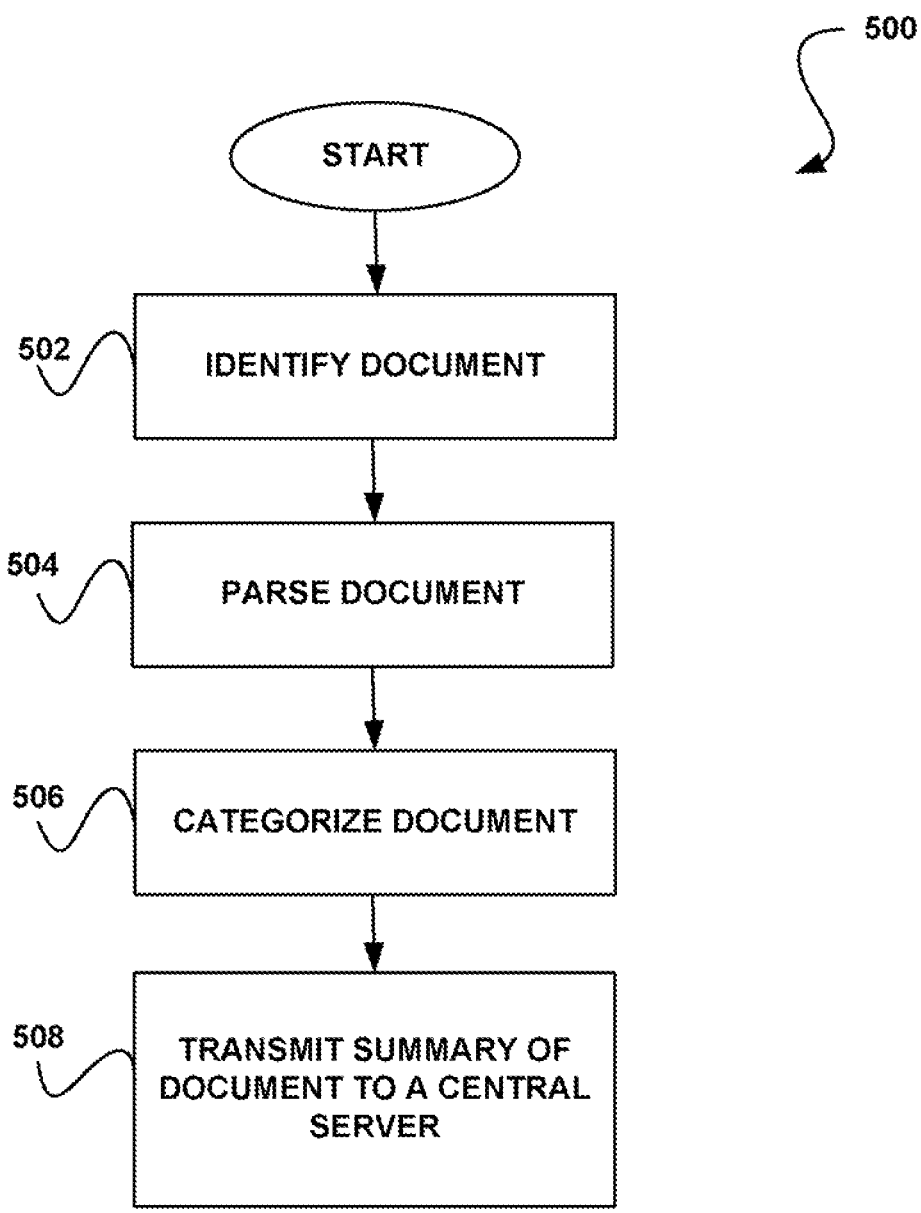
FIG. 5 shows a method for identifying summary information of a document utilizing an application, in accordance with still yet another embodiment.

FIG. 5 shows a method 500 for identifying summary information of a document utilizing an application, in accordance with still yet another embodiment. As an option, the method 500 may be carried out in the context of the architecture and environment of FIGS. 1-5. For example, the method 500 may be carried out utilizing the applications 404A-N of FIG. 4. Of course, however, the method 500 may be carried out in any desired environment. It should also be noted that the aforementioned definitions may apply during the present description.

As shown in operation 502, a document is identified. Such document may be stored on a system (e.g. such as one of the file servers 406A-N in FIG. 4). In one embodiment, the document may be identified by searching the file server for documents stored therein. As an option, identifying the document may further include loading the document, or a copy of the content therein.

Further, the document may be identified in response to any desired condition. In one embodiment, the document may be identified at a predetermined time (e.g. every day, etc.). In another embodiment, the document may be identified in response to a manual prompt by a user.

Additionally, the document is parsed, as shown in operation 504. In one embodiment the document may be parsed for identifying data therein. For example, such data may include words, symbols, etc.

Still yet, the document is categorized. Note operation 506. In one embodiment, the document may be categorized utilizing the data therein. In another embodiment, the document may be categorized based on criteria. Such criteria may include a template, rules, etc. capable of being utilized for categorizing documents.

For example, a plurality of categorizations may each be associated with different criteria. Thus, the document may be categorized with respect to a particular categorization if the document matches the criteria associated therewith. In one embodiment, the criteria may be predetermined (e.g. by a user, etc.).

Just by way of example, a financial categorization may be associated with criteria which includes financial symbols (e.g. "$", etc.) or terms. To this end, a document may be categorized as a financial document if such document includes any of such financial symbols. Of course, as another option, the document may be associated with a particular categorization if a threshold associated with such categorization is met by the document. For instance, in the example above, the document may be categorized as a financial document if such document includes a predetermined threshold number of such financial symbols or terms.

In another embodiment, the criteria may be based on the analysis of a selected document with a known characterization (e.g. by the user, etc.). For example, such document with the known characterization may be selected by a user. In addition, the selected document may be parsed to identify the content (e.g. text, etc.) therein. Further, the criteria may be generated based on the identified content, such as, for example, by extracting the criteria (e.g. keywords, repeated words, etc.) from the identified content. As an option, the generated criteria may be modified, rejected and/or accepted by the user.

In this way, categorization information describing the document may be identified by parsing the document. Of course, other information may further be collected including, but not limited to location information, etc. Using such information, a summary of the document may be generated.

Moreover, such summary of the document is transmitted to a central server, as shown in operation 508. Such central server may include, as an option, the central server 402 of FIG. 4. In various embodiments, the summary of the document may include any information describing the document. In one embodiment, the summary of the document may include a location and a categorization of the document. In this way, information describing any number of different documents may be identified and transmitted to the central server utilizing summaries, as opposed to the data itself.

Figure 6:
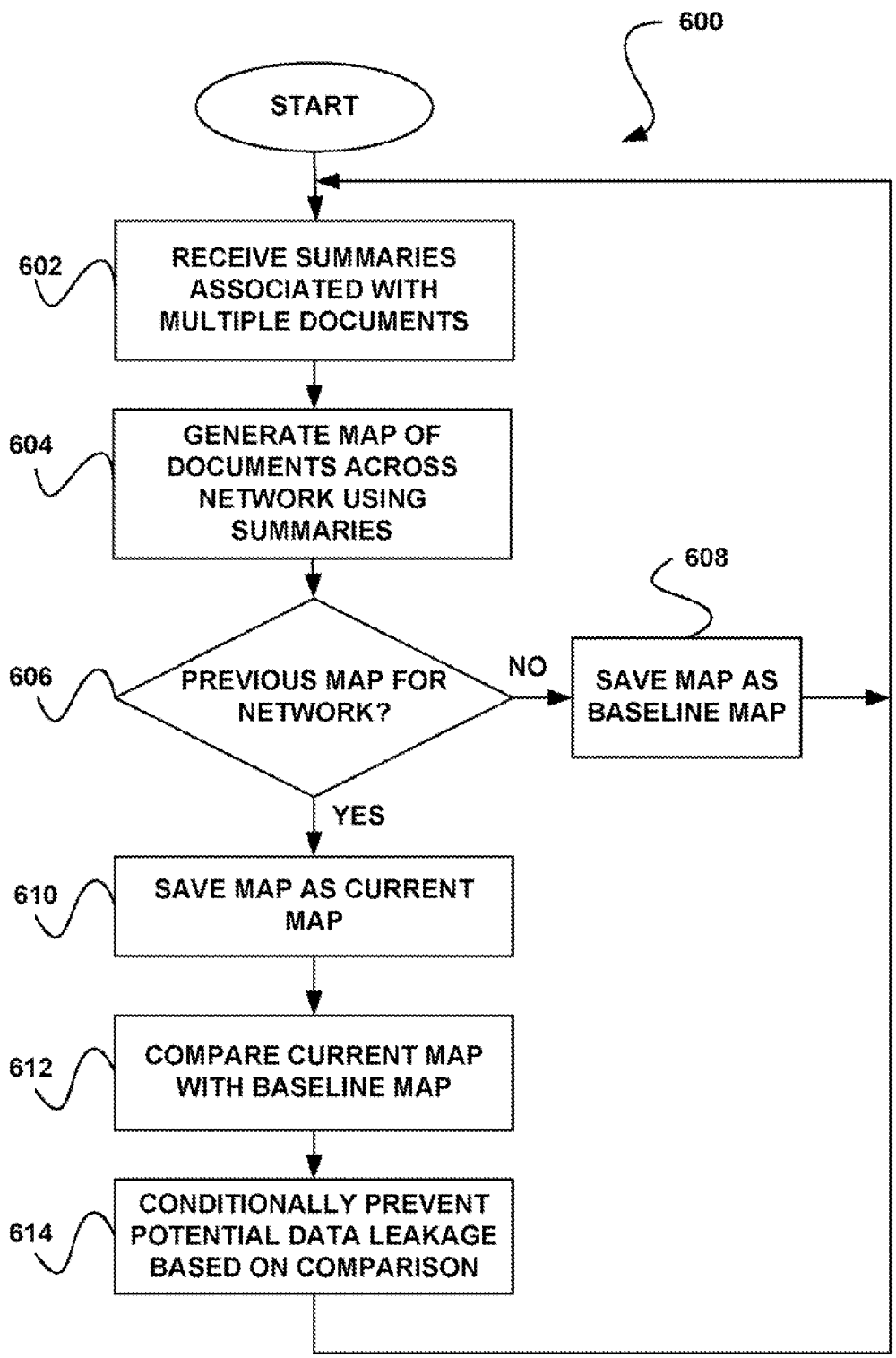
FIG. 6 shows a method for conditionally preventing data leakage at a server, utilizing a map, in accordance with another embodiment.

FIG. 6 shows a method 600 for conditionally preventing data leakage at a server, utilizing a map, in accordance with another embodiment. As an option, the method 600 may be carried out in the context of the architecture and environment of FIGS. 1-5. For example, the method 600 may be carried out utilizing the central server 402 of FIG. 4. Of course, however, the method 600 may be carried out in any desired environment. It should also be noted that the aforementioned definitions may apply during the present description.

As shown in operation 602, summaries associated with multiple documents are received. In one embodiment, the summaries may be received from a single application (e.g. such as one of the applications 404A-N of FIG. 4) that generated the summaries. In another embodiment, the summaries may be received from a plurality of different applications that each generated at least one of the summaries. Additionally, the summaries may be received via a network.

Further, in the context of the present embodiment, the documents may be located at various locations across the network. For example, the documents may be stored on different systems (e.g. such as the file servers 406A-N of FIG. 4). Of course, in another optional embodiment, the documents may be stored on a single system.

To this end, the summaries may each include information describing one or more particular documents stored on a system. In one embodiment, each summary may include a location which uniquely identifies the system (or portion thereof) on which the associated document is stored. In another embodiment, each summary may identify a categorization of the associated document.

As also shown, a map of the documents across the network is generated, utilizing the summaries. Note operation 604. In one embodiment, the map may associate a plurality of locations identified by the summaries with the respective categorizations of documents. For example, a first location that identifies a first system may be associated with a single categorization or a plurality of categorizations via the map. The categorizations associated with a particular location via the map may be based on the categorizations of documents stored on the system identified by such location.

Table 1 illustrates one exemplary mapping of the documents across the network based on each location. It should be noted that such mapping is set forth for illustrative purposes only, and thus should not be construed as limiting in any manner.

TABLE 1

| Location__01 | Category__01; Category__02 |
| Location__02 | Category__02; Category__04 |
| Location__03 | Category__03 |

As another option, the map may associate groups of locations with the respective categorizations of documents. For example, a first group may include two different locations, such that the categorizations of documents associated with such two different locations may be mapped to the first group, etc.

Table 2 illustrates one exemplary mapping of the documents across the network based on groups of locations. Again, it should be noted that such mapping is set forth for illustrative purposes only, and thus should not be construed as limiting in any manner.

TABLE 2

| Group__01: Location__01; Location__02 | Category__01; Category__02 |
| Group__02: Location__03; Location__04 | Category__02; Category__04 |
| Group__03: Location__05; Location__06 | Category__03 |

Still yet, it is determined whether a previous map for the network has been generated, as shown in decision 606. Such previous map may include a map of the network that was generated prior to the generation of the map of the documents across the network (in operation 604). If it is determined that a previous map has not been generated, the generated map of the documents across the network is saved (e.g. stored) as a baseline map. Note operation 608.

Thus, the baseline map may include a network map to which later generated network maps are compared, as described in more detail below. As an option, the generated map may be saved as the baseline map only in response to a confirmation by a user. For example, in response to a determination that a previous map has not been generated, the user may be prompted to confirm or deny the storage of the generated map as the baseline map. In other embodiments, the baseline map may be manually configured without necessarily receiving input from file systems, etc.

If, however, it is determined that a previous map has been generated, the generated map of the documents across the network is saved (e.g. stored) as a current map. See operation 610. In this way, the current map may include a network map which may be compared to the previously generated map (i.e. baseline map). Accordingly, the current map is compared with the baseline map, as shown in operation 612.

In one embodiment, comparing the current map with the baseline map may include comparing categorizations mapped to each location. For example, the comparison may identify differences in categorizations of documents between the current map and the baseline map with respect to each location. Of course, the comparison may identify any differences in information describing various documents from which the current map and the baseline map were generated.

Furthermore, data leakage is conditionally prevented based on the comparison, as shown in operation 614. In one embodiment data leakage may be prevented by securing documents in locations for which the current map is different than the baseline map. For example, if a location in the current map is associated with at least one different categorization than the same location in the baseline map, data leakage for documents associated with such location may be prevented [e.g. by securing the document(s) in such location, etc.].

As an option, securing the location may include preventing transfer of documents, deleting of documents, quarantining of documents, etc. As another option, securing the location may include preventing transfer of documents that prompted the differences identified between the current map and the baseline map. For example, in one exemplary embodiment, the baseline map for a particular location may include Category__01, and the current map for the same particular location may include Category__01 and Category__02. Thus, any documents stored in the system identified by the particular location that are associated with Category__02 may be secured.

As another option, the current map may optionally be saved as the baseline map. For example, the current map may be saved as the baseline map in response to the conditional prevention of the data leakage (operation 614). As another example, the current map may be saved as the baseline map in response to a user request (e.g. after inspecting the differences and approving them, etc.). In this way, data leakage, and even potential data leakage, may be prevented utilizing maps of the documents across the network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
receiving information describing data stored on at least one system;
generating a baseline map of the data, utilizing the information;
generating a current map that reflects a network map, wherein generating the baseline map and the current map includes mapping a location of the data to a catego- rization of the data, and wherein the location of the data includes an internet protocol address associated with the at least one system;

comparing the baseline map to the current map prior to receiving a request to transmit at least some of the data, wherein the comparing includes:

identifying differences in categorizations for documents between the baseline map and the current map with respect to their respective locations on a plurality of different file servers; and preventing a transfer of the documents over a network based on the differences in the categorizations for the documents between the baseline map and the current map.

2. The method of claim 1, wherein the data includes at least one file.

3. The method of claim 1, wherein the data includes at least one electronic mail message.

4. The method of claim 1, wherein the information includes a categorization of the data.

5. The method of claim 4, wherein the categorization is associated with criteria.

6. The method of claim 5, wherein the criteria is predetermined.

7. The method of claim 6, wherein the criteria is based on a selected document.

8. The method of claim 4, wherein the categorization is associated with a group within an organization.

9. The method of claim 1, wherein the information includes a statistical analysis of the data.

10. The method of claim 9, wherein the statistical analysis indicates a number of occurrences of at least one predetermined keyword within the data.

11. The method of claim 1, wherein the data is stored on a single system.

12. The method of claim 1, wherein the data is stored on a group of systems.

13. The method of claim 1, wherein the location of the data further includes at least one of a pathname associated with the data, a user name, and a machine name.

14. The method of claim 1, wherein the information describing the data is identified by parsing the data.

15. The method of claim 1, further comprising accessing a policy, which indicates an allowable threshold number of differences between the baseline map and the current map, for permitting a transmission of at least some of the data.

16. The method of claim 15, wherein data leakage is conditionally prevented based on the policy.

17. The method of claim 1, wherein data leakage is prevented by securing the data.

18. Logic embodied on a tangible non-transitory computer readable medium for performing operations, comprising:

receive information describing data stored on at least one system;

generating a baseline map of the data, utilizing the information;

generating a current map that reflects a network map, wherein generating the baseline map and the current map includes mapping a location of the data to a categorization of the data, and wherein the location of the data includes an internet protocol address associated with the at least one system;

comparing the baseline map to the current map prior to receiving a request to transmit at least some of the data, wherein the comparing includes:

identifying differences in categorizations for documents between the baseline map and the current map with respect to their respective locations on a plurality of different file servers; and preventing a transfer of the documents over a network based on the differences in the categorizations for the documents between the baseline map and the current map.

19. The tangible non-transitory computer readable medium of claim 18, wherein the data includes at least one file.

20. The tangible non-transitory computer readable medium of claim 18, wherein the data includes at least one electronic mail message.

21. The tangible non-transitory computer readable medium of claim 18, wherein the information includes a categorization of the data.

22. The tangible non-transitory computer readable medium of claim 21, wherein the categorization is associated with criteria and the criteria is predetermined.

23. The tangible non-transitory computer readable medium of claim 18, wherein the information includes a statistical analysis of the data.

24. The tangible non-transitory computer readable medium of claim 23, wherein the statistical analysis indicates a number of occurrences of at least one predetermined keyword within the data.

25. The tangible non-transitory computer readable medium of claim 18, wherein generating the baseline map includes mapping a location of the data to a categorization of the data.

26. The tangible non-transitory computer readable medium of claim 18, wherein the location of the data includes at least one of a pathname associated with the data, a user name, and a machine name.

27. The tangible non-transitory computer readable medium of claim 18, the operations further comprising accessing a policy, which indicates an allowable threshold number of differences between the baseline map and the current map, for permitting a transmission of at least some of the data.

28. A central server, comprising:
a baseline map of data stored in a memory;
a current map of data stored in the memory;
a processor communicatively coupled to the memory;
logic communicatively coupled to the processor to:
receive information describing data stored on at least one system,
generate a baseline map of the data, utilizing the information, and
generate a current map that reflects a network map, wherein generating the baseline map and the current map includes mapping a location of the data to a categorization of the data, and wherein the location of the data includes an internet protocol address associated with the at least one system,
compare the baseline map to the current map prior to receiving a request to transmit at least some of the data,
wherein the compare includes:
identifying differences in categorizations for documents between the baseline map and the current map with respect to their respective locations on a plurality of different file servers; and
prevent a transfer of the documents over a network based on the differences in the categorizations for the documents between the baseline map and the current map.

29. The central server of claim 28, wherein the data includes at least one file.

30. The central server of claim 28, wherein the data includes at least one electronic mail message.

31. The central server of claim 28, wherein the information includes a categorization of the data.

32. The central server of claim 31, wherein the categorization is associated with criteria and the criteria is predetermined.

33. The central server of claim 28, wherein the information includes a statistical analysis of the data.

34. The central server of claim 33, wherein the statistical analysis indicates a number of occurrences of at least one predetermined keyword within the data.

35. The central server of claim 28, wherein generating the baseline map includes mapping a location of the data to a categorization of the data.

36. The central server of claim 28, wherein the location of the data includes at least one of a pathname associated with the data, a user name, and a machine name.

37. The central server of claim 28, the logic being communicatively coupled to the processor to access a policy, which indicates an allowable threshold number of differences between the baseline map and the current map, for permitting a transmission of at least some of the data.

* * * * *